(12) United States Patent
Chen et al.

(10) Patent No.: US 10,447,158 B2
(45) Date of Patent: Oct. 15, 2019

(54) REDUCING VOLTAGE RATING OF DEVICES IN A MULTILEVEL CONVERTER

(71) Applicant: Texas Instruments Incorporated, Dallas, TX (US)

(72) Inventors: Chih-Wei Chen, Sunnyvale, CA (US); Yogesh Kumar Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 3 days.

(21) Appl. No.: 15/200,793

(22) Filed: Jul. 1, 2016

(65) Prior Publication Data
US 2018/0006559 A1   Jan. 4, 2018

(51) Int. Cl.
| | | |
|---|---|---|
| *H02M 3/158* | (2006.01) | |
| *H02M 1/08* | (2006.01) | |
| *H02M 1/36* | (2007.01) | |
| *H02M 7/483* | (2007.01) | |
| *H02M 1/00* | (2006.01) | |

(52) U.S. Cl.
CPC ............. *H02M 3/158* (2013.01); *H02M 1/08* (2013.01); *H02M 1/36* (2013.01); *H02M 7/483* (2013.01); *H02M 2001/007* (2013.01)

(58) Field of Classification Search
CPC .................................. H02M 3/158; H02M 1/08
USPC ........................................................ 323/271
See application file for complete search history.

(56) References Cited

U.S. PATENT DOCUMENTS

| | | | | |
|---|---|---|---|---|
| 5,939,742 A | * | 8/1999 | Yiannoulos | H01L 27/14609 257/291 |
| 6,194,948 B1 | * | 2/2001 | Scian | G05F 3/205 326/27 |
| 6,643,151 B1 | | 11/2003 | Nebrigic et al. | |
| 7,706,163 B2 | * | 4/2010 | Tan | H02M 7/487 363/132 |
| 8,325,502 B2 | * | 12/2012 | Giombanco | H02M 1/36 363/21.08 |

(Continued)

FOREIGN PATENT DOCUMENTS

| | | | |
|---|---|---|---|
| EP | 2651024 A2 | 10/2013 | |
| EP | 2996239 A2 | 3/2016 | |

OTHER PUBLICATIONS

Received STIC search report from EIC 2800 searcher Patel Samir on Mar. 30, 2017.*

(Continued)

*Primary Examiner* — Nguyen Tran
*Assistant Examiner* — Htet Z Kyaw
(74) *Attorney, Agent, or Firm* — Kenneth Liu; Charles A. Brill; Frank D. Cimino

(57) ABSTRACT

A method for operating a multi-level converter is disclosed. A multi-level converter is provided with a plurality of switches connected in series and a flying capacitor connected to switch nodes of the plurality of switches. The switch nodes are biased initially to a fraction of an input voltage when the input voltage is initially applied to the plurality of switches. The flying capacitor is then precharged to a flying capacitor operating voltage. The multi-level converter is then operated after the flying capacitor is precharged by activating control signals to the plurality of switches. Diversion of precharge current by the plurality of switches may be performed while the flying capacitor is being precharged.

10 Claims, 7 Drawing Sheets

(56) References Cited

U.S. PATENT DOCUMENTS

| | | | | |
|---|---|---|---|---|
| 8,582,331 B2* | 11/2013 | Frisch | | H02M 7/48 363/131 |
| 8,710,903 B2* | 4/2014 | Oraw | | H02M 3/07 327/337 |
| 9,397,584 B2* | 7/2016 | Oughton, Jr. | | H02M 7/797 |
| 9,559,541 B2* | 1/2017 | Cheng | | H02M 7/483 |
| 2002/0101741 A1* | 8/2002 | Brkovic | | H02M 1/08 363/16 |
| 2002/0122324 A1* | 9/2002 | Kim | | H02M 3/073 363/59 |
| 2004/0085086 A1* | 5/2004 | LeChevalier | | G09G 3/3216 345/84 |
| 2007/0053216 A1* | 3/2007 | Alenin | | H02M 3/07 363/60 |
| 2009/0140712 A1* | 6/2009 | Giombanco | | H02M 1/36 323/288 |
| 2013/0195165 A1* | 8/2013 | Poulton | | H04B 1/04 375/229 |
| 2013/0223651 A1* | 8/2013 | Hoyerby | | H03F 3/2173 381/120 |
| 2014/0169040 A1 | 6/2014 | Schroeder et al. | | |
| 2014/0376287 A1* | 12/2014 | Narimani | | H02M 3/07 363/60 |
| 2015/0280608 A1* | 10/2015 | Yoscovich | | H02M 7/483 363/131 |
| 2016/0211762 A1* | 7/2016 | Cheng | | H02M 7/483 |
| 2017/0237339 A1* | 8/2017 | Young | | H02M 1/4225 363/126 |

OTHER PUBLICATIONS

Michael Douglas Seeman, "A Design Methodology for Switched-Capacitor DC-DC Converters", Technical Report No. UCB/EECS-2009-78, Electrical Engineering and Computer Sciences, University of California at Berkeley, May 21, 2009, pp. 1-83.

Michael Douglas Seeman, "A Design Methodology for Switched-Capacitor DC-DC Converters", Technical Report No. UCB/EECS-2009-78, Electrical Engineering and Computer Sciences, University of California at Berkeley, May 21, 2009, pp. 84-249.

Alex Ruderman, Boris Reznikov and Michael Margaliot, "Analysis of a Flying Capacitor Converter: A Switched Systems Approach", 13th International Power Electronics and Motion Control Conference (EPE-PEMC'08) Conference Proceedings, Poland, 2008, pp. 1-20.

Michael Douglas Seeman, "A Design Methodology for Switched-Capacitor DC-DC Converters", Technical Report No. UCB/EECS-2009-78, Electrical Engineering and Computer Sciences, University of California at Berkeley, May 21, 2009, pp. 1-249.

International Search Report for PCT/US2017/040618 dated Oct. 19, 2017.

* cited by examiner

REDUCING VOLTAGE RATING OF DEVICES IN A MULTILEVEL CONVERTER

FIELD OF THE INVENTION

This disclosure relates to multilevel voltage converters, and in particular to reducing the voltage rating of devices in a multilevel converter that uses a flying capacitor.

BACKGROUND OF THE INVENTION

The multilevel switching converter (MC) is an emerging topology in the industry because it enables using lower voltage-rated devices compared to conventional two-level switching converters. When compared to conventional converters, MCs allow higher power ratings, higher efficiency, and lower harmonic distortion. Due to a better FoM (figure of merit) of these lower voltage-rated devices, higher efficiency of the converters is expected. There are several architecture types of MCs, including: multiple point clamped that is typically diode clamped, flying capacitor, and cascaded H-bridge with separate DC sources.

The flying capacitor multilevel converter (FCC) is a multilevel pulse-width modulated (PWM) converter whose internal architecture automatically maintains a voltage balancing property for passive loads. A single-leg FCC may be used for both DC/DC and DC/AC conversion.

BRIEF DESCRIPTION OF THE DRAWINGS

Particular embodiments in accordance with the invention will now be described, by way of example only, and with reference to the accompanying drawings.

Figure 1A:
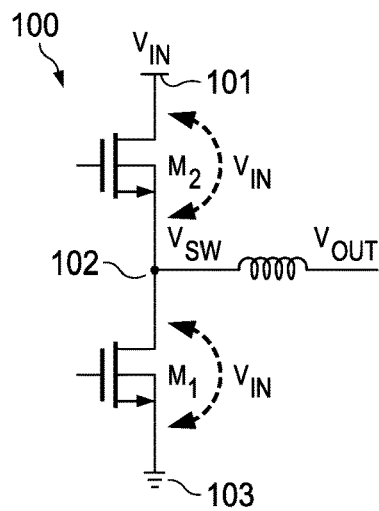
FIGS. 1A and 1B are a schematic and a timing diagram of a prior art two level converter.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As mentioned above, the flying capacitor multilevel switching converter is an emerging topology in the industry because it enables using lower voltage-rated devices compared to two-level switching converters. However, during start-up condition, there is no initial charge stored in the flying capacitors, and hence some of the switching devices may still see the full input voltage. Therefore, one or more of the switching devices will need to be higher voltage-rated devices, which increases the die area and overall loss. The benefit of multilevel switching converters is diminished because of this problem.

For example, in a typical previous solution, start up of the circuit is performed by biasing each switching node at zero voltage and then allowing the flying capacitor to charge up to its operating voltage. This scheme limits the number of higher voltage-rated devices required to one.

Circuits and methods will be disclosed herein in which a pre-conditioning method is performed that biases the switching nodes to a fraction of the input voltage at the same time when the input voltage ramps up quickly during start-up. Then, the flying capacitor is slowly charged by ramping one of the plates of the capacitor from the bias voltage to the ground, or other system reference potential. By doing this, only a portion of the input voltage will be seen by all of the switching devices and lower voltage-rated devices may be used for all of the switching devices. In this manner, the full advantages of multilevel converters may be realized. No higher voltage-rated devices are required. By only using lower voltage-rated devices, smaller die area, less switching and conduction losses may be achieved, which leads to lower cost and higher efficiency.

Figure 1B:
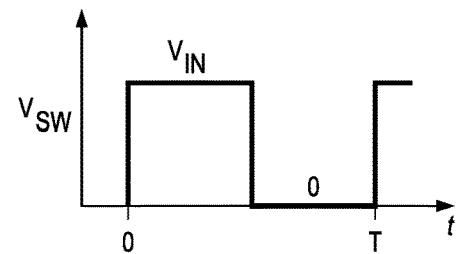

FIGS. 1A and 1B are a schematic and a timing diagram of a prior art two level converter 100. In this example, two transistors M1, M2 are connected in series with a switch terminal 102 between them. An input voltage is applied to input terminal 101 and return terminal 103 is connected to a ground reference voltage. During operation of converter 100, switching transistors M1, M2 are alternately turned on and off to produce a switched voltage at switch terminal 102, as illustrated by the waveform of FIG. 1B. In this example, switch devices are N-channel metal oxide semiconductor (NMOS) devices.

During operation, each switching device is subject to blocking the full input voltage Vin, which means each switching device must be rated to withstand Vin.

Figure 2B:
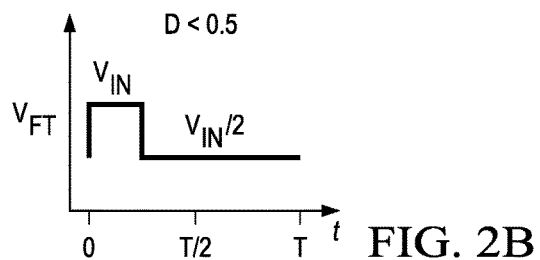
FIGS. 2A-2G are a schematic and a set of timing diagrams of a prior art three level converter with a flying capacitor.
Figure 2C:
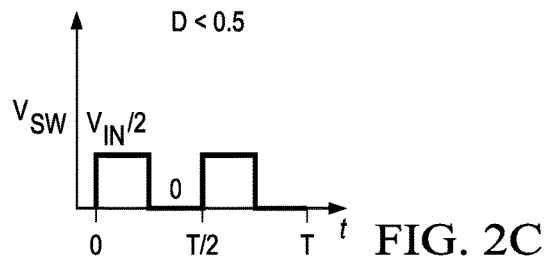
Figure 2A:
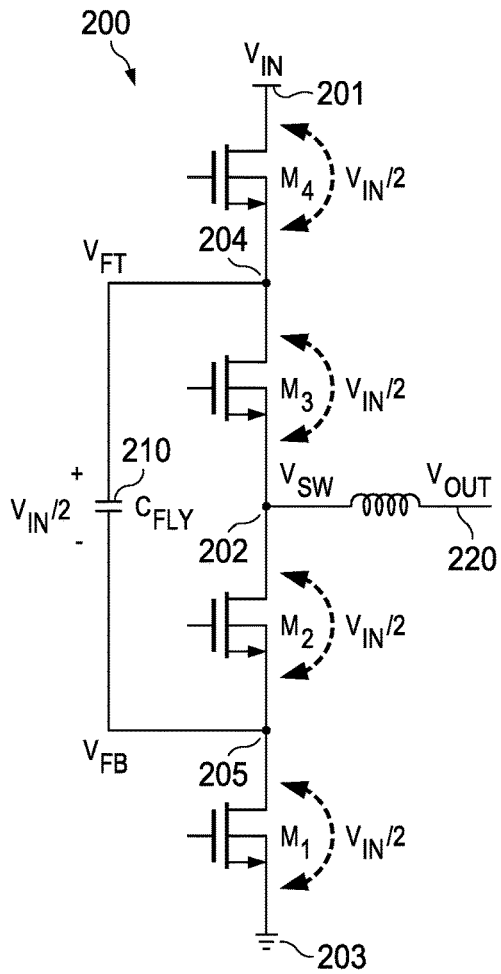
Figure 2D:
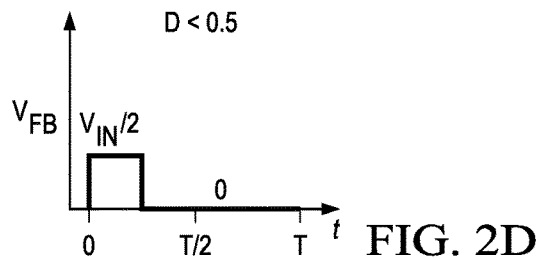
Figure 2E:
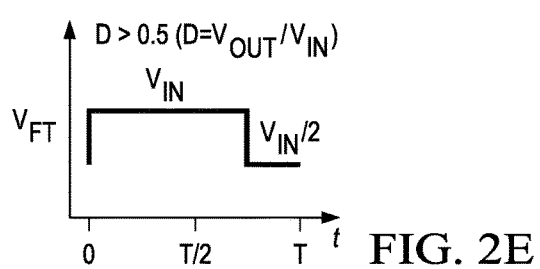
Figure 2F:
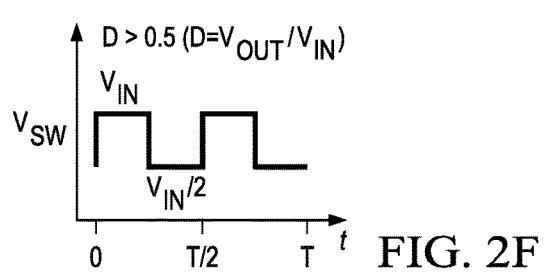
Figure 2G:
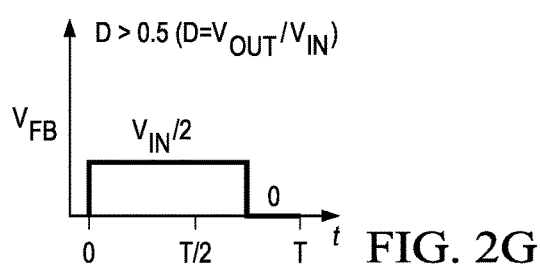

FIGS. 2A-2G are a schematic and a set of timing diagrams of a prior art three level converter 200 with a flying capacitor 210. In this example, four transistors M1-M4 are connected in series with a switch terminal 202 between M2 and M3. Flying capacitor (Cfly) 210 is connected to switch nodes 204, 205. An input voltage is applied to input terminal 201 and return terminal 203 is connected to a ground reference voltage. During operation of converter 200, switching transistors M1-M4 are alternately turned on and off to produce a switched voltage at switch terminal 202. The on/off timing of the various switching devices M1-M4 may be selected to allow a selected voltage level to be produced on switch node 202 and thereby on voltage output terminal 220. For example, FIGS. 2B-2D illustrate a timing selection in which Vout/Vin is less than 0.5; FIGS. 2E-2G illustrate operation of a timing selection in which Vout/Vin is greater than 0.5.

As a result of the switching, flying capacitor 210 becomes charged to approximately $V_{IN}/2$ which then serves to maintain switch node 204 at a voltage of approximately $V_{IN}/2$ while switch device M1 is turned on and switch device M4 is turned off. Similarly, $C_{FLY}$ 210 serves to maintain switch node 205 at a voltage of approximately $V_{IN}/2$ while switch device M4 is turned on and switch node M1 is turned off. The general operation of multilevel converters is well known and need not be described in detail herein; see, e.g. Ruderman et al., "Analysis of a flying Capacitor Converter: a Switched System Approach" 2009.

In this example, the blocking voltage seen by each of $M_1$-$M_4$ is $V_{IN}/2$ ideally. Lower voltage devices may be used to handle $V_{IN}/2$ as compared to devices that are rated to withstand $V_{IN}$. This should result in smaller size and loss and hence higher efficiency.

However, there is a problem during startup. Initially, no charge is stored on $C_{FLY}$ 210 so the voltage at switch node 204 from the $C_{FLY}$ top plate ($V_{FT}$) and the voltage at switch node 205 from the $C_{FLY}$ bottom plate ($V_{FB}$) will be 0 volts if $M_1$ is on initially. Therefore switching device $M_4$ will see the full $V_{IN}$ until $C_{FLY}$ 210 becomes charged through device $M_4$ and therefore has to be rated for the higher voltage. Alternatively, $V_{FB}$ at switch node 205 will be $V_{IN}$ if $M_4$ is on initially; therefore switching device $M_1$ will see the full $V_{IN}$ until $C_{FLY}$ 210 becomes charged. Thus, at least one of the switching devices M1, M4 must be rated to withstand the full $V_{IN}$. As discussed above, this reduces the benefit of the multilevel topology.

FIGS. 3A-3G are schematic and timing diagrams of an improved multilevel converter 300 with a flying capacitor 310. Converter 300 is similar to converter 200. In this example, four transistors M1-M4 are connected in series with a switch terminal 302 between M2 and M3. Flying capacitor (Cfly) 310 is connected to switch nodes 304, 305. An input voltage is applied to input terminal 301 and return terminal 303 is connected to a ground reference voltage. During operation of converter 300, switching transistors M1-M4 are alternately turned on and off to produce a switched voltage at switch terminal 302. The on/off timing of the various switching devices M1-M4 may be selected to allow a selected voltage level to be produced on switch node 302 and thereby on voltage output terminal 320.

Improved multilevel converter 300 also includes a precharge circuit 330 that is coupled to flying capacitor 310. Precharge circuit 330 is configured to initially bias the switch nodes 304, 305 to a fraction of the input voltage and then to gradually precharge the flying capacitor to a flying capacitor operating voltage when an input voltage is initially applied to the input voltage terminal 301. In this example, the bias voltage and the capacitor operating voltage are approximately $V_{IN}/2$. In this manner, switch nodes 304 and 305 are maintained at voltage levels that enable all of switch devices M1-M4 to be rated to withstand a lower voltage of approximately $V_{IN}/2$.

Precharge circuit 330 includes several switches S1-S4 that are used to control the operation of the precharge circuit. Switches S1-S4 may be implemented in a number of ways, such as: bipolar junction transistors, field effect transistors such as NMOS or PMOS devices, etc. In some embodiments, mechanical switch or contact points may be used, for example. One skilled in the art will understand how to provide appropriate control and/or biasing circuitry to control the selected type of switch device.

Figure 3A:
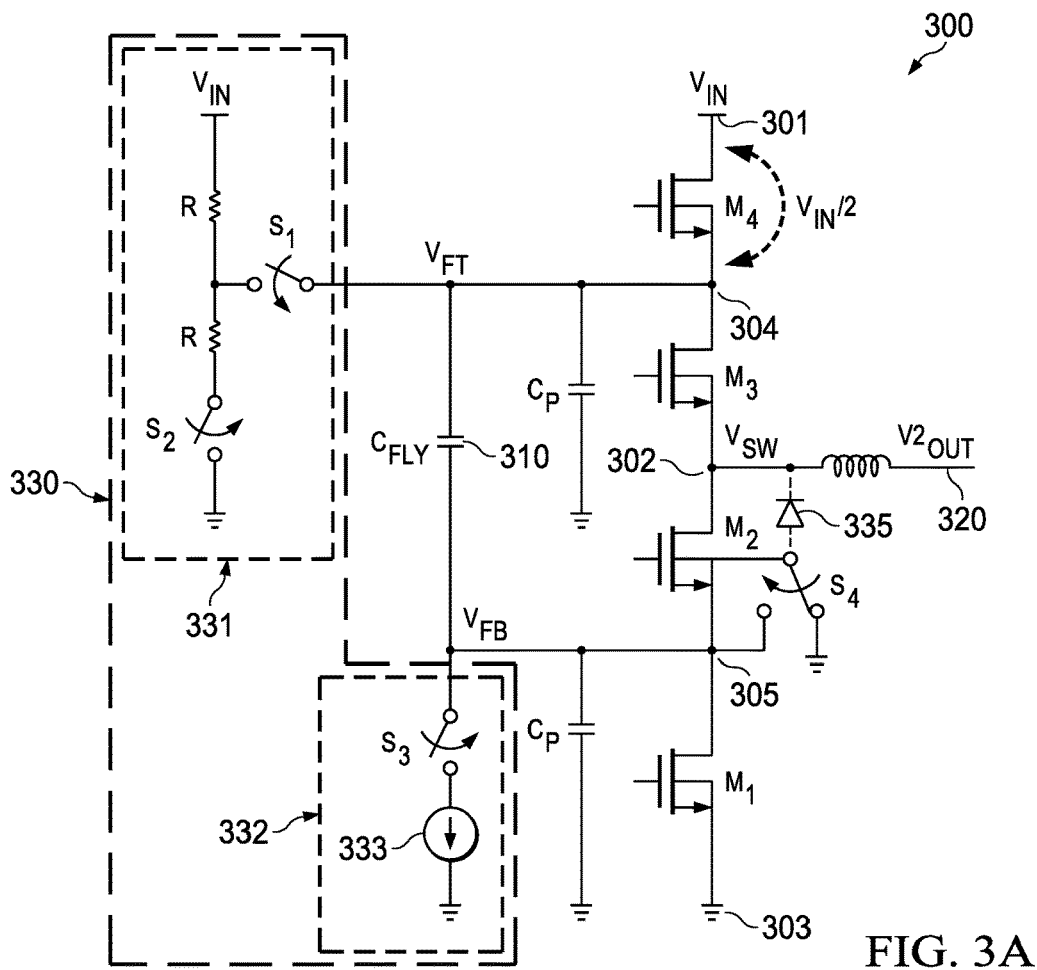
FIGS. 3A-3G are schematic and timing diagrams of an improved multilevel converter with a flying capacitor.
Figure 3B:
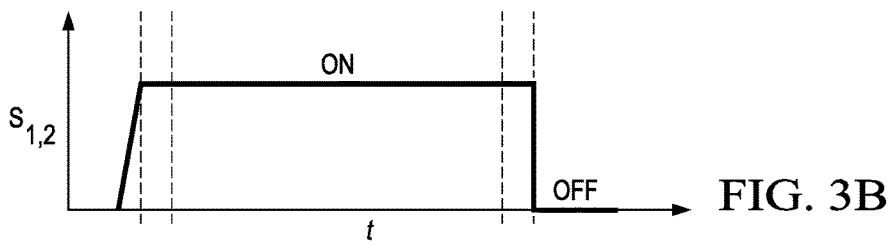
Figure 3C:
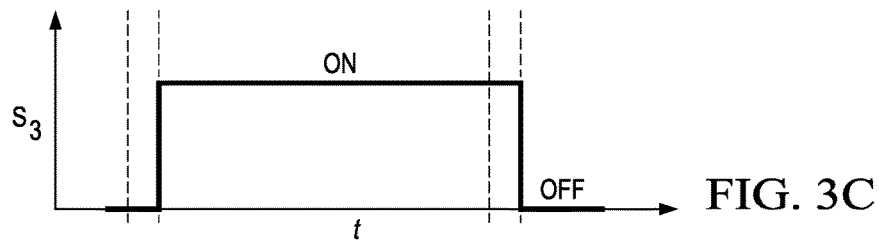
Figure 3D:
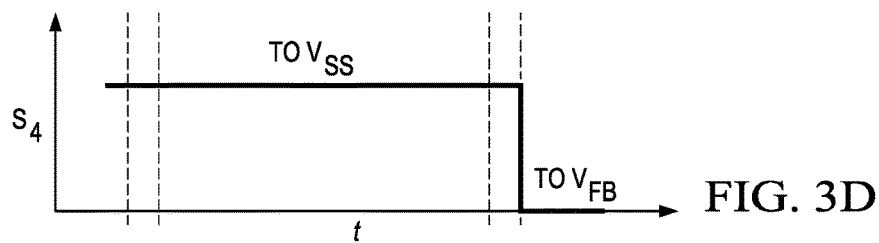
Figure 3E:
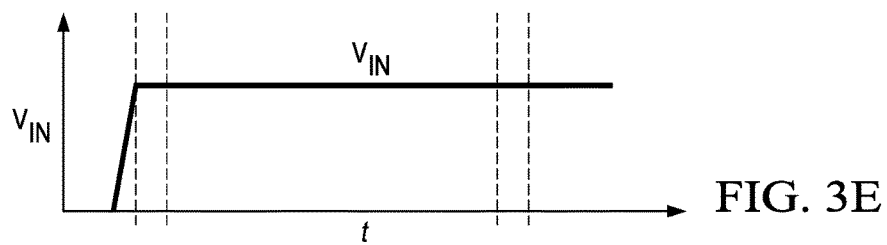
Figure 3F:
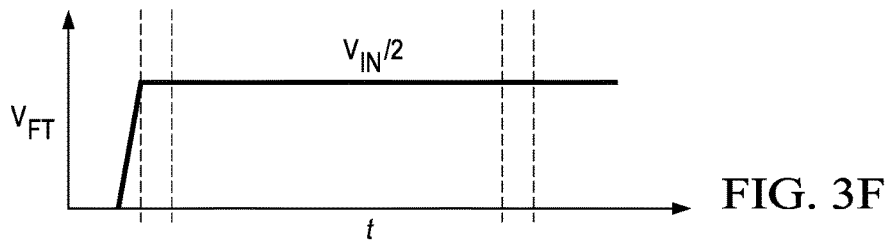

During initial operation when $V_{IN}$ is turned on as illustrated in FIG. 3E, switch devices M1 and M4 are both turned off. After $V_{IN}$ is applied, switches S1 and S2 are turned on as illustrated in FIG. 3B and thereby a voltage divider circuit 331 is activated and coupled to a top plate of $C_{FLY}$ 310 and switch node 304 to produce a top plate voltage $V_{FT}$, as illustrated in FIG. 3F. In some embodiments, S2 may be replaced by a permanent connection to ground, but this would result in wasted power. In other embodiments, S2 may be located at a different position in the series connected resistors R. In this embodiment, resistors R are selected to produce a bias voltage of approximately $V_{IN}/2$ that is applied to switch node 304 and the top plate of $C_{FLY}$ 310 via switch S1, referred to as $V_{FT}$. Resistors R may be implemented as passive impedance devices or resistive traces, or as transistors that are biased to a resistive conductive mode, for example. In another embodiment, a reference device such as a Schottky diode may be used to generate a bias voltage, for example.

Figure 3G:
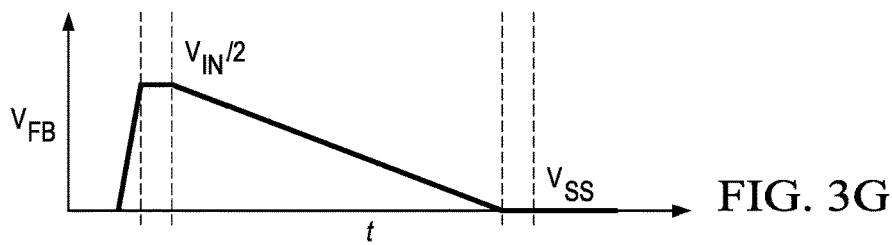

Initially, $C_{FLY}$ 310 has no charge, so the voltage on the bottom plate of $C_{FLY}$ 310, referred to as $V_{FB}$, and thereby the voltage on switch node 305 is biased at $V_{IN}/2$ as shown in FIG. 3G.

After a short period of time, switch S3 of current source circuit 332 is turned on as illustrated in FIG. 3C. Switch S3 couples the bottom plate of $C_{FLY}$ 310 and switch node 305 to current source 333. Current source 333 of current source circuit 332 is designed to slowly charge $C_{FLY}$ 310 so that the bottom plate of $C_{FLY}$ 310 and switch node 305 approach a voltage of approximately 0, as illustrated in FIG. 3G. This results in a charge being stored on $C_{FLY}$ 310 that produces a voltage of approximately $V_{IN}/2$. Current source 333 may include circuitry to produce an approximately constant current, or current source 333 may be a simple resistor or other impedance device, for example.

After a period of time that is long enough to charge $C_{FLY}$ 310, switches S1-S3 are turned off to disconnect precharge circuit 330 from $C_{FLY}$ 310, as illustrated in FIGS. 3B, 3C. Normal operation of multi-level converter may now commence by activating a selected switching sequence of switch devices M1-M4. In this manner, $C_{FLY}$ 310 is precharged before either of switch devices M1 and M4 are turned on; therefore neither switch device will be exposed to a voltage higher than approximately $V_{IN}/2$. Thus, all of the switching devices M1-M4 may be sized to withstand voltages that do not exceed approximately $V_{IN}/2$.

In this example, switching devices M1-M4 are NMOS devices. It is well known that a parasitic diode 335 exists between the source and the body of an NMOS and similarly a PMOS device. This usually causes latchup when left open and is typically connected to the lowest supply to avoid latchup. The parasitic diode occurs because the substrate is P substrate (in NMOS) and the source and drain are n+ regions. Both the bulk and source and bulk and drain regions form a diode. When it is forward biased, it becomes an alternate path for current to flow and most of the currents may pass to the bulk instead of through the channel. When reverse biased, it will develop capacitance due to the inherent nature of the diode. Due to its reverse capacitance and diode nature, the body and source node are typically shorted to minimize its effect.

However, parasitic diode 335 may divert a portion of the precharge current to switch node 302 and may result in it taking longer for $C_{FLY}$ 310 to precharge to $V_{IN}/2$, or it may prevent $C_{FLY}$ 310 from fully precharging to $V_{IN}/2$. In this embodiment, a switch S4 is configured to allow the bulk region to be disconnected from the source region and be connected to the ground reference while $C_{FLY}$ 310 is being precharged, as illustrated in FIG. 3D. After a period of time to allow precharging, switch S4 may then be configured to short the bulk region to the source region during normal operation of multi-level converter 300, as illustrated in FIG. 3D.

Figure 4:
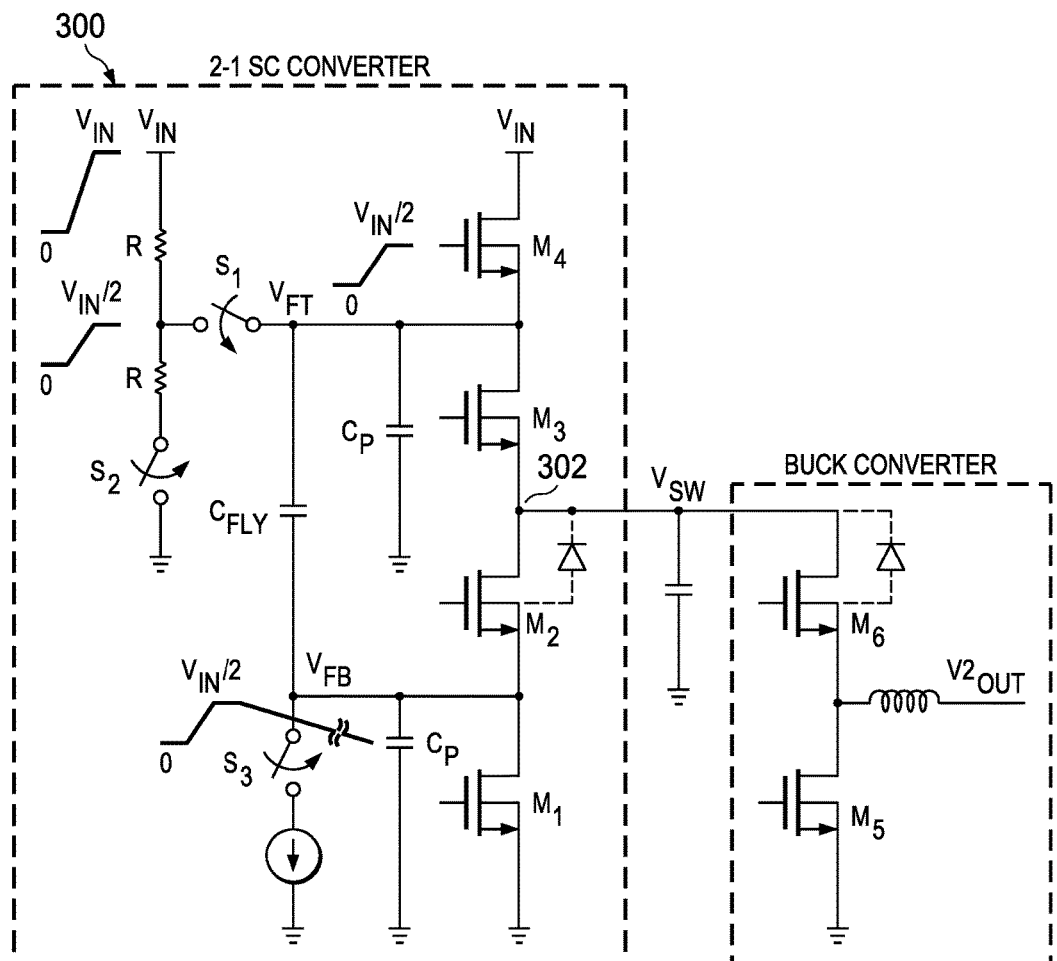
FIG. 4 is a schematic of the multilevel converter of FIG. 3A coupled to a downstream regulator.

FIG. 4 is a schematic of the multilevel converter 300 of FIG. 3A coupled to a downstream regulator 440. A voltage regulator is typically designed to automatically maintain a constant voltage level. A voltage regulator may be a simple "feed-forward" design or may include negative feedback control loops. It may use an electromechanical mechanism, or electronic components. Depending on the design, it may be used to regulate one or more AC or DC voltages.

In this example, regulator 440 is a Buck converter that allows the voltage developed at switch node 302 to be reduced to a voltage level that is lower than $V_{IN}$. The operation of Buck converters is well known and need not be described in further detail herein. In other embodiments, other types of known or later developed regulators or converters may be combined with an embodiment of a flying capacitor converter as described herein.

Figure 5:
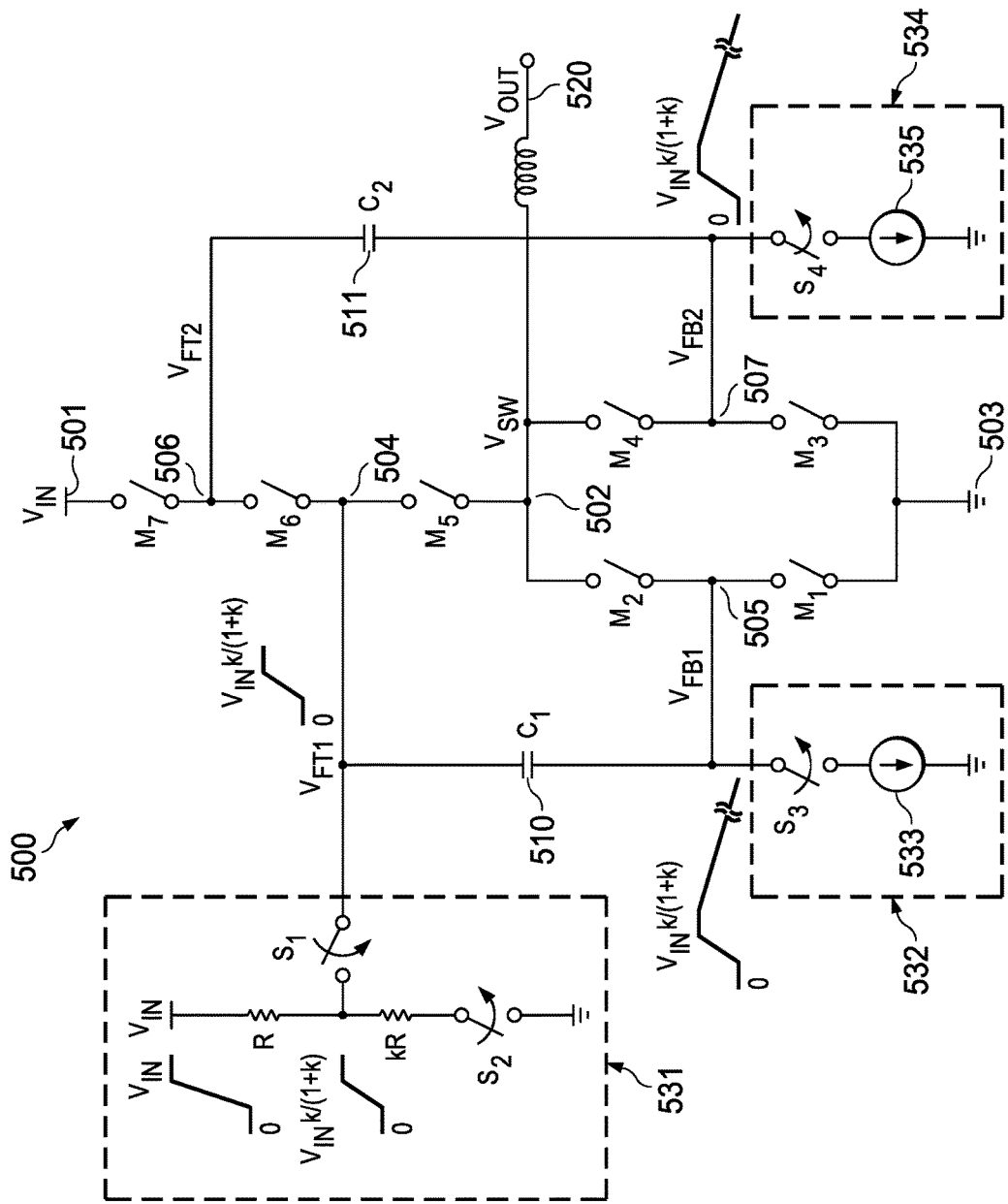
FIG. 5-6 are schematics of alternative embodiments of multilevel converters.

FIG. 5 is a schematic of an alternative embodiment of a multilevel converter 500. Embodiments of this disclosure may include many types of known or later developed multi-level converter topologies, such as: ladder, Dickson, Fibonacci, Series-Parallel, Doubler, etc. The general operation of these topologies is known and need not be described in further detail herein; see, e.g. Seeman, "A Design Methodology for Switched-Capacitor DC-DC Converters", 2009.

Example multi-level converter 500 has a Dickson 3:1 topology. In this example, five switch devices M1, M2, M5, M6, and M7 are connected in series with a switch terminal 502 between M2 and M5. Flying capacitor ($C_{FLY}$) 510 is connected to switch nodes 504, 505. In this example, switches M3 and M4 are also connected in series with switches M5-M7 with switch terminal 502 between M4 and M5. A second flying capacitor 511 is connected to switch nodes 506, 507. An input voltage is applied to input terminal 501 and return terminal 503 is connected to a ground reference voltage. During operation of converter 500, switching transistors M1-M7 are alternately turned on and off to produce a switched voltage $V_{SW}$ at switch terminal 502. The on/off timing of the various switching devices M1-M7 may be selected to allow a selected voltage level to be produced on switch node 502 and thereby on voltage output node 520.

Converter 500 also includes a precharge circuit that includes bias circuit 531 and two current source circuits 532, 534 that are coupled to flying capacitors 510, 511. In a similar manner as described above with regard to FIG. 3, the precharge circuit is configured to initially bias the switch nodes 504, 505, 506, and 507 to a fraction of the input voltage as determined by a resistor ratio k/(1+k) when an input voltage is initially applied to the input voltage terminal 501. The flying capacitors are then gradually charged to the bias voltage before normal operation of multilevel converter 500 commences. The value of "k" may be selected to provide a preferred bias voltage to match the voltage blocking characteristics of switching devices M1-M7.

In this example, the bias voltage is designed to be approximately $V_{IN}/2$ by setting k =1. In this manner, switch nodes 504, 505, 506, and 507 are maintained at voltage levels that enable all of switch devices M1-M7 to be rated to withstand a lower voltage of approximately $V_{IN}/2$. During normal operation, the operating voltage of $C_{FLY}$ 510 is approximately Vin/3 and the operating voltage of $C_{FLY}$ 511 is approximately Vin*2/3. This precharge circuit may limit the initial voltage across M1-M7 to Vin/2. However, during normal operation, a voltage of only approximately Vin/3 appears across M1-M7.

Similar to the operation of precharge circuit 330 in FIG. 3, the precharge circuit includes several switches S1-S4 that are used to control the operation of the precharge circuit. Switches S1-S4 may be implemented in a number of ways, such as: bipolar junction transistors, field effect transistors such as NMOS or PMOS devices, etc. In some embodiments, mechanical switch or contact points may be used, for example. One skilled in the art will understand how to provide appropriate control and/or biasing circuitry to control the selected type of switch device.

During initial operation when $V_{IN}$ is turned on, switch devices M1-M7 are all turned off. After $V_{IN}$ is applied, switches S1 and S2 are turned on and thereby voltage divider bias circuit 531 is activated and coupled to a top plate of $C_{FLY}$ 510 and switch node 504 to produce a top plate voltage $V_{FT1}$. Switch M6 is also turned on and thereby voltage divider circuit 531 is coupled to a top plate of $C_{FLY}$ 511 and switch node 506 to produce a top plate voltage $V_{FT2}$. In some embodiments, S2 may be replaced by a permanent connection to ground, but this would result in wasted power. In other embodiments, S2 may be located at a different position in the series connected resistors R. In this embodiment, resistors R are selected to produce a bias voltage of approximately $V_{IN}/2$ that is applied to switch node 504 and the top plate of $C_{FLY}$ 510 via switch 51, referred to as $V_{FT1}$. Resistors R may be implemented as passive impedance devices or resistive traces, or as transistors that are biased to a resistive conductive mode, for example. In another embodiment, a reference device such as a Schottky diode may be used to generate a bias voltage, for example.

Initially, $C_{FLY}$ 510 has no charge, so the voltage on the bottom plate of $C_{FLY}$ 510, referred to as $V_{FB1}$, and thereby the voltage on switch node 505 is biased at $V_{IN}/2$. Similarly, $C_{FLY}$ 511 initially has no charge, so the voltage on the bottom plate of $C_{FLY}$ 511, referred to as $V_{FB2}$, and thereby the voltage on switch node 506 is biased at approximately $V_{IN}/2$ minus any voltage drop across switch M6.

After a short period of time, switches S3 and S4 are turned on. Switch S3 couples the bottom plate of $C_{FLY}$ 510 and switch node 505 to current source 533. Current source 533 is designed to slowly charge $C_{FLY}$ 510 so that the bottom plate of $C_{FLY}$ 510 and switch node 505 approach a voltage of approximately 0. This results in a charge being stored on $C_{FLY}$ 510 that produces a voltage of approximately $V_{IN}/2$. Similarly, switch S4 couples the bottom plate of $C_{FLY}$ 511 and switch node 507 to current source 535. Current source 535 is designed to slowly charge $C_{FLY}$ 511 so that the bottom plate of $C_{FLY}$ 511 and switch node 507 approach a voltage of approximately 0. This results in a charge being stored on $C_{FLY}$ 511 that produces a voltage of approximately $V_{IN}/2$.

After a period of time that is long enough to charge $C_{FLY}$ 510 and $C_{FLY}$ 511, switches S1-S4 are turned off to disconnect precharge circuits 531, 532, and 534 from $C_{FLY}$ 510 and 511. Normal operation of multi-level converter 500 may now commence by activating the selected switching sequences of switch devices M1-M7. In this manner, $C_{FLY}$ 510 and $C_{FLY}$ 511 are precharged before either of switch devices M1, M3, and M4 are turned on, therefore none of the switch devices will be exposed to a voltage higher than approximately $V_{IN}/2$. Thus, all of the switching devices M1-M7 may be sized to withstand voltages that do not exceed approximately $V_{IN}/2$.

In this example, switching devices M1-M7 may be NMOS devices. Blocking circuitry, such as switch S4 in FIG. 3, may be added to prevent diversion of precharge current to switch terminal 502 by parasitic diodes in switch device M1-M7 while the flying capacitors are being precharged, as described in more detail above.

Figure 6:
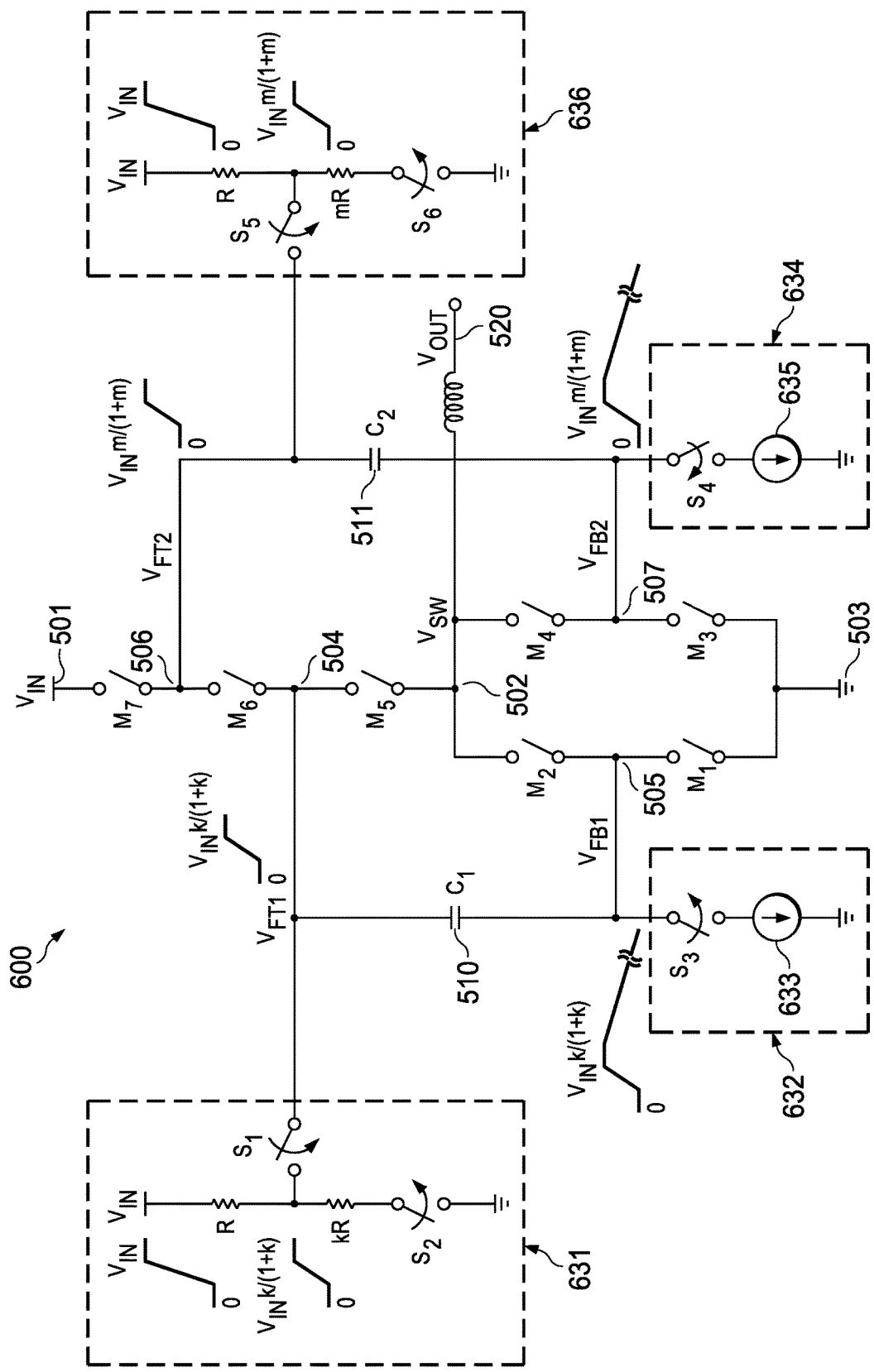

FIG. 6 is a schematic of an alternative embodiment of a multilevel converter 600. Example multi-level converter 600 also has a Dickson 3:1 topology, similar to that of converter 500 of FIG. 5. However, in this example, a second precharge bias circuit 636 is included to provide a different initial bias voltage to flying capacitor 511. Bias circuit 631 uses a resistor divider with a ratio of R:kR, while bias circuit 636 uses a resistor divider with a ratio of R:mR. The value of k and m may be selected based on the target voltage ratings of the switching devices, for example. For this configuration of switches M1-M7, k is typically selected from a range of approximately 0.5-1, while m is typically selected from a range of 1-2. In other embodiments, additional levels of switching devices may be added, in which case the range of k, m may be from approximately 0.25-4, for example.

In this example, k is selected to be 0.5 and precharge bias circuit 631 provides a bias voltage of approximately $V_{IN}/3$ to $C_{FLY}$ 510, while m is selected to be 2 and precharge bias circuit 636 provides a bias voltage of approximately $2V_{IN}/3$ to $C_{FLY}$ 511. However, in another embodiment different resistor ratios may be selected for bias circuits 631, 636 to provide a different bias voltage for precharging flying capacitors 510, 511.

After a short period of time, switches S3 and S4 are turned on. Switch S3 couples the bottom plate of $C_{FLY}$ 510 and switch node 505 to current source 633. Current source 633 is designed to slowly charge $C_{FLY}$ 510 so that the bottom plate of $C_{FLY}$ 510 and switch node 505 approach a voltage of approximately 0. This results in a charge being stored on $C_{FLY}$ 510 that produces a voltage of approximately $V_{IN}/3$. Similarly, switch S4 couples the bottom plate of $C_{FLY}$ 511 and switch node 507 to current source 635. Current source 635 is designed to slowly charge $C_{FLY}$ 511 so that the bottom plate of $C_{FLY}$ 511 and switch node 507 approach a voltage of approximately 0. This results in a charge being stored on $C_{FLY}$ 511 that produces a voltage of approximately $2V_{IN}/3$.

After a period of time that is long enough to charge $C_{FLY}$ 510 and $C_{FLY}$ 511, switches S1-S6 are turned off to disconnect precharge circuits 631, 632, 634, and 636 from $C_{FLY}$ 510 and 511. Normal operation of multi-level converter 600 may now commence by activating the selected switching sequences of switch devices M1-M7. In this manner, $C_{FLY}$ 510 and $C_{FLY}$ 511 are precharged before any of switch devices M1-M7 are turned on, therefore switch devices M1, M2, M4-M7 will not be exposed to a voltage higher than approximately $V_{IN}/3$. Switch M3 may be exposed to a voltage of approximately 2Vin/3. Switches M1-M7 may therefore be sized accordingly to withstand the lower operating voltages.

In this example, switching devices M1-M7 may be NMOS devices. Blocking circuitry, such as switch S4 in FIG. 3, may be added to prevent diversion of precharge current to switch terminal 502 by parasitic diodes in switch device M1-M7 while the flying capacitors are being precharged, as described in more detail above.

Figure 7:
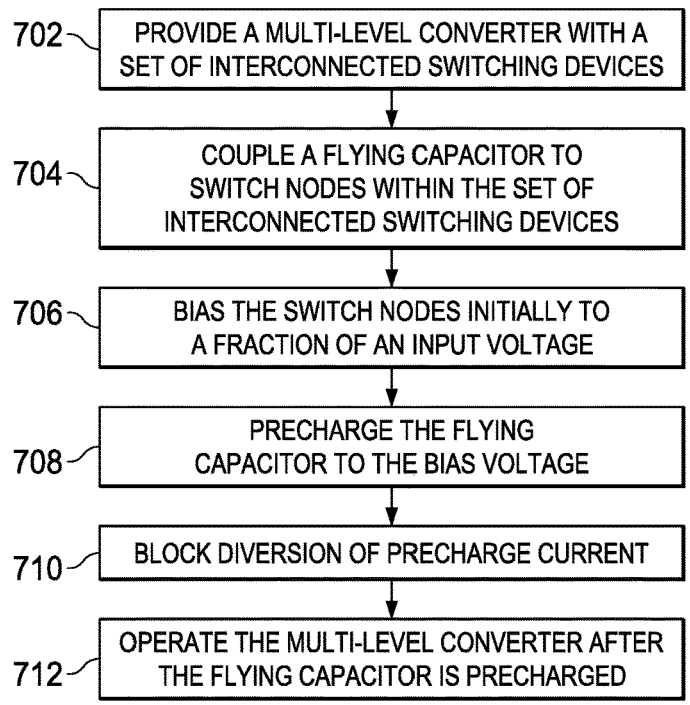
FIG. 7 is a flow chart illustrating operation an improved multilevel converter.

FIG. 7 is a flow chart illustrating operation an improved multilevel converter, such as any of the multilevel converters described in more detail above with regard to FIGS. 3A-3F and 4-6. A multilevel voltage converter may be implemented by providing 702 a set of interconnected switching devices. As disclosed above, various embodiments may use different topologies, such as: ladder, Dickson, Fibonacci, Series-Parallel, Doubler, etc. Various embodiments may be designed to produce various output voltage levels, such as: a lower output voltage than the input voltage, a higher output voltage than the input, an opposite polarity voltage, etc. The switching devices may be implemented in a number of ways, such as: bipolar junction transistors, field effect transistors such as NMOS or PMOS devices, etc.

One or more flying capacitors are coupled 704 to switch nodes within the set of interconnected switches as illustrated in FIGS. 3A, 4-6. As is known, the flying capacitors are self balancing and provide a bias voltage to each switching node to which they are connected.

As described above in more detail, when an input voltage is first applied to the multilevel converter, the flying capacitor(s) are not charged. In order to prevent overstressing of one or more of the switching devices due to the lack of charge on the flying capacitor(s), a biasing circuit may be temporally coupled to one plate of the flying capacitor(s) to bias 706 the switch nodes initially to a fraction of the input voltage. As described above in more detail, this may be done using a voltage divider or voltage reference.

Then, the flying capacitor(s) may be precharged 708 to a voltage that is approximately equal to the bias voltage. As described above in more detail, the flying capacitor operating voltage may be equal to approximately ½ the input voltage, ⅓ the input voltage, etc, depending on the topology of the multilevel converter. As described above in more detail, this may be done using a current source or other charging circuit that is temporally connected to an opposite plate of the flying capacitor(s) from the plate that is coupled to the bias circuit for a period of time.

In some embodiments, parasitic diodes or other sneak paths may exist that may divert some or all of the precharge current from the flying capacitor(s). In this case, blocking circuitry may be temporally activated during the precharge time period, as described above in more detail, to block 710 diversion of the precharge current while the flying capacitor(s) is being precharged.

After precharging the flying capacitor(s), operation of the multilevel voltage convert may then be started 712 by causing the set of switching devices to switch in a designated pattern by activating control signals that control the switching devices, as is well known. After normal operation is started, the voltage across each flying capacitor will balance out to a "flying capacitor operating voltage" that may be approximately equal to the bias voltage as described with regard to FIG. 3, or may be different as described with regard to FIG. 5.

System Example

Figure 8:
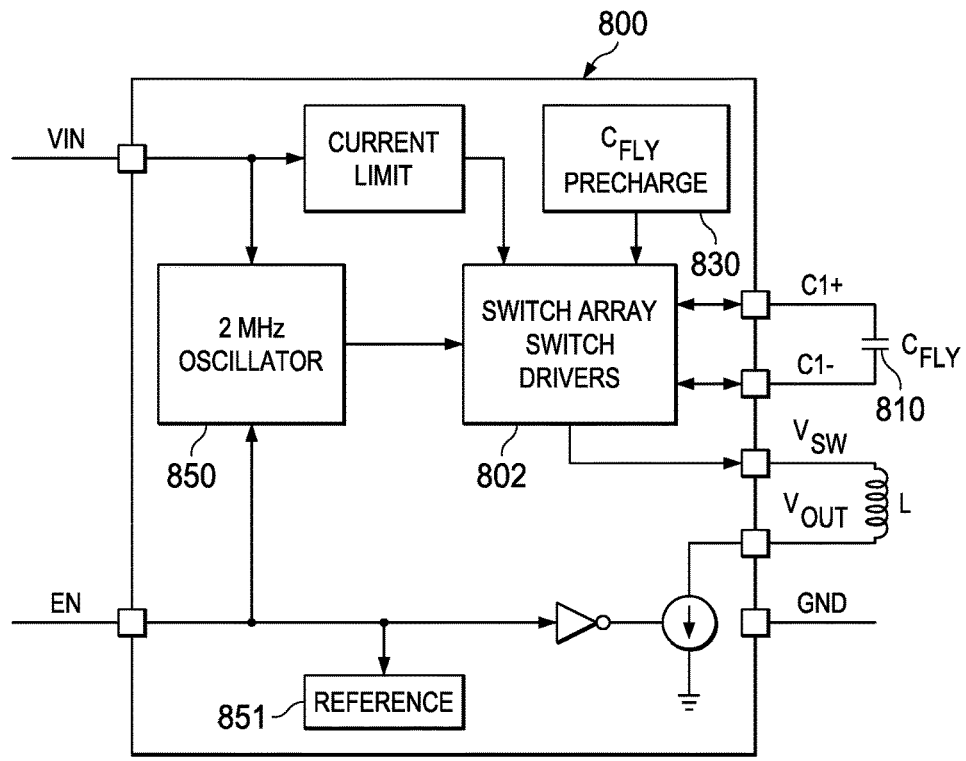
FIG. 8 is a block diagram of an integrated circuit that includes a multilevel converter.

FIG. 8 is a block diagram of an integrated circuit (IC) 800 that includes a multilevel converter as disclosed herein. Typically, the flying capacitor(s) 810 is connected externally to the IC due to its required charge capacity. For example, in this example, an input voltage (VIN) of up to approximately 5 volts may be accepted. An output voltage (VOUT) may be generated that has a value of 1.5 volts, for example. Typically, the flying capacitor may need to have a value of approximately 1 uF, for example.

An array of switching devices 802 may be provided in one of many topologies, as described above in more detail. An oscillator and control circuitry 850 may be provided to control the switching sequence of the array of switching devices as defined by a voltage reference circuit 851. A flying capacitor precharge circuit 830 may be provided as disclosed herein to initially precharge the flying capacitor(s) when the input voltage is initially applied. Operation of multilevel converter 800 may be turned on/off by an enable signal EN, for example.

Voltage $V_{SW}$ is equivalent to the switched voltage at node 302 or 502, referring back to the prior Figures. Inductor L may be located outside of IC 800 to provide smoothing of Vsw to produce final output voltage VOUT. VOUT may be routed back into IC 800 in order to monitor and adjust regulation of the output voltage.

Systems that may incorporate an improved multilevel voltage converter as disclosed herein are myriad. For example, battery powered mobile devices, such as cellular telephones, laptop computers, tablet computers, personal data assistants, medical devices, etc. Other systems that may incorporate an improved multilevel voltage converter as disclosed herein include systems that receive primary AC voltage and need to produce a different AC or DC voltage, automotive components, solar powered devices, industrial systems, etc.

Other Embodiments

While the invention has been described with reference to illustrative embodiments, this description is not intended to be construed in a limiting sense. Various other embodiments of the invention will be apparent to persons skilled in the art upon reference to this description. For example, while multilevel converters with three or four levels were described herein, other embodiments may have seven, eight or more levels with corresponding additional flying capacitors.

While the examples described herein illustrate a ground reference, other embodiments may operate using two voltage planes, in which neither one is ground. In another example, a negative voltage reference plane may be used.

Embodiments of this disclosure may include converters that produce a lower output voltage than the input voltage, converters that produce a higher output voltage than the input voltage, converters that produce an inverted polarity output voltage, etc.

Embodiments of the disclosure may be used to produce an alternating current (AC) output voltage or a direct current (DC) output voltage.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A multi-level converter comprising:
   a plurality of MOSFET switches connected in series with a switch terminal located among the plurality of MOSFET switches configured to provide an output voltage, in which an input voltage terminal is connected to an initial one of the plurality of MOSFET switches and a return voltage terminal is connected to a last one of the plurality of MOSFET switches;
   a flying capacitor connected to switch nodes of the plurality of MOSFET switches;
   a precharge circuit coupled to the flying capacitor and configured to initially bias the switch nodes to a bias voltage equal to a fraction of an input voltage and then to precharge the flying capacitor to the bias voltage when the input voltage is initially applied to the input voltage terminal; and
   blocking circuitry comprising a first precharge switch coupled to a body terminal of a first MOSFET switch of the plurality of MOSFET switches and operable to prevent diversion of precharge current to the switch terminal by the first MOSFET switch while the flying capacitor is being precharged;
   wherein, the first precharge switch is configured to be in a first position when the flying capacitor is being precharged in which the first precharge switch couples the body terminal of the first MOSFET switch to a ground reference while also isolating the body terminal of the first MOSFET switch from a source terminal of the first MOSFET switch; and
   wherein, the first precharge switch is configured to be in a second position after the flying capacitor is precharged in which the first precharge switch isolated the body terminal of the first MOSFET switch from the ground reference while also coupling the body terminal of the first MOSFET switch to the source terminal of the first MOSFET switch.

2. The multi-level converter of claim 1, wherein the first precharge switch is operable to disable a parasitic body diode within the first MOSFET switch while the flying capacitor is being precharged.

3. The multi-level converter of claim 2, wherein the first precharge switch disables the parasitic body diode by coupling the body terminal of the first MOSFET switch to the ground reference while the flying capacitor is being precharged.

4. The multi-level converter of claim 1, in which the plurality of MOSFET switches includes four switches and in which the bias voltage is approximately ½ the input voltage.

5. The multi-level converter of claim 1, in which the bias voltage is approximately ⅓ of the input voltage.

6. The multi-level converter of claim 1, further including a second flying capacitor connected in parallel with a portion of a second plurality of MOSFET switches connected in series, in which the second flying capacitor is coupled to the precharge circuit.

7. The multi-level converter of claim 1, further including:
   a second flying capacitor connected in parallel with portion of a second plurality of MOSFET switches connected in series; and
   a second precharge circuit coupled to the second flying capacitor configured to precharge the second flying capacitor to a second bias voltage.

8. The multi-level converter of claim 1, further including a downstream regulator coupled to the switch terminal.

9. The multi-level converter of claim 8, in which the downstream regulator is a buck converter.

10. The multi-level converter of claim 1, wherein, when the first precharge switch is in the first position, a signal path that extends between the body terminal of the first MOSFET switch and the ground reference and does not include the source terminal of the first MOSFET switch is provided through the first precharge switch.

* * * * *